(12) United States Patent
Vasamsetti et al.

(10) Patent No.: US 11,652,897 B2
(45) Date of Patent: *May 16, 2023

(54) METHOD AND SYSTEM FOR APPLICATION MANAGEMENT SERVICE

(71) Applicant: Verizon Patent and Licensing Inc., Basking Ridge, NJ (US)

(72) Inventors: Satish S. Vasamsetti, San Francisco, CA (US); Parry Cornell Booker, Arlington, TX (US); Peter B. Sensenbrenner, North Richland Hills, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,130

(22) Filed: Sep. 7, 2022

(65) Prior Publication Data

US 2023/0122000 A1     Apr. 20, 2023

Related U.S. Application Data

(63) Continuation of application No. 17/503,465, filed on Oct. 18, 2021, now Pat. No. 11,477,300.

(51) Int. Cl.
*H04L 67/51* (2022.01)
*H04L 41/50* (2022.01)

(52) U.S. Cl.
CPC .............. *H04L 67/51* (2022.05); *H04L 41/50* (2013.01)

(58) Field of Classification Search
CPC ................................ H04L 67/51; H04L 41/50
USPC .......................................................... 709/223
See application file for complete search history.

(56) References Cited

U.S. PATENT DOCUMENTS

| | | |
|---|---|---|
| 9,762,402 B2 | 9/2017 | Batz et al. |
| 2019/0098104 A1 | 3/2019 | Kim et al. |
| 2020/0228602 A1 | 7/2020 | Spoczynski et al. |
| 2021/0144057 A1 | 5/2021 | Giust et al. |
| 2021/0144517 A1 | 5/2021 | Guim et al. |
| 2021/0328933 A1* | 10/2021 | Thyagaturu ......... H04L 41/5025 |

* cited by examiner

*Primary Examiner* — Wing F Chan
*Assistant Examiner* — Leon Y Tseng

(57) ABSTRACT

A method, a device, and a non-transitory storage medium are described in which an application management service is provided. The service may provide a coordination between network or platform level application management functions and application level application management functions that enables the management of an application service. The network or platform level application management functions may include autoscaling, load balancing, and ingress resource management. The application level application management functions may include throttling and circuit breaker functions.

20 Claims, 7 Drawing Sheets

METHOD AND SYSTEM FOR APPLICATION MANAGEMENT SERVICE

CROSS REFERENCE TO RELATED APPLICATION

This patent application is a continuation of U.S. patent application Ser. No. 17/503,465, entitled "METHOD AND SYSTEM FOR APPLICATION MANAGEMENT SERVICE" and filed on Oct. 18, 2021, the disclosure of which is incorporated by reference herein in its entirety.

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
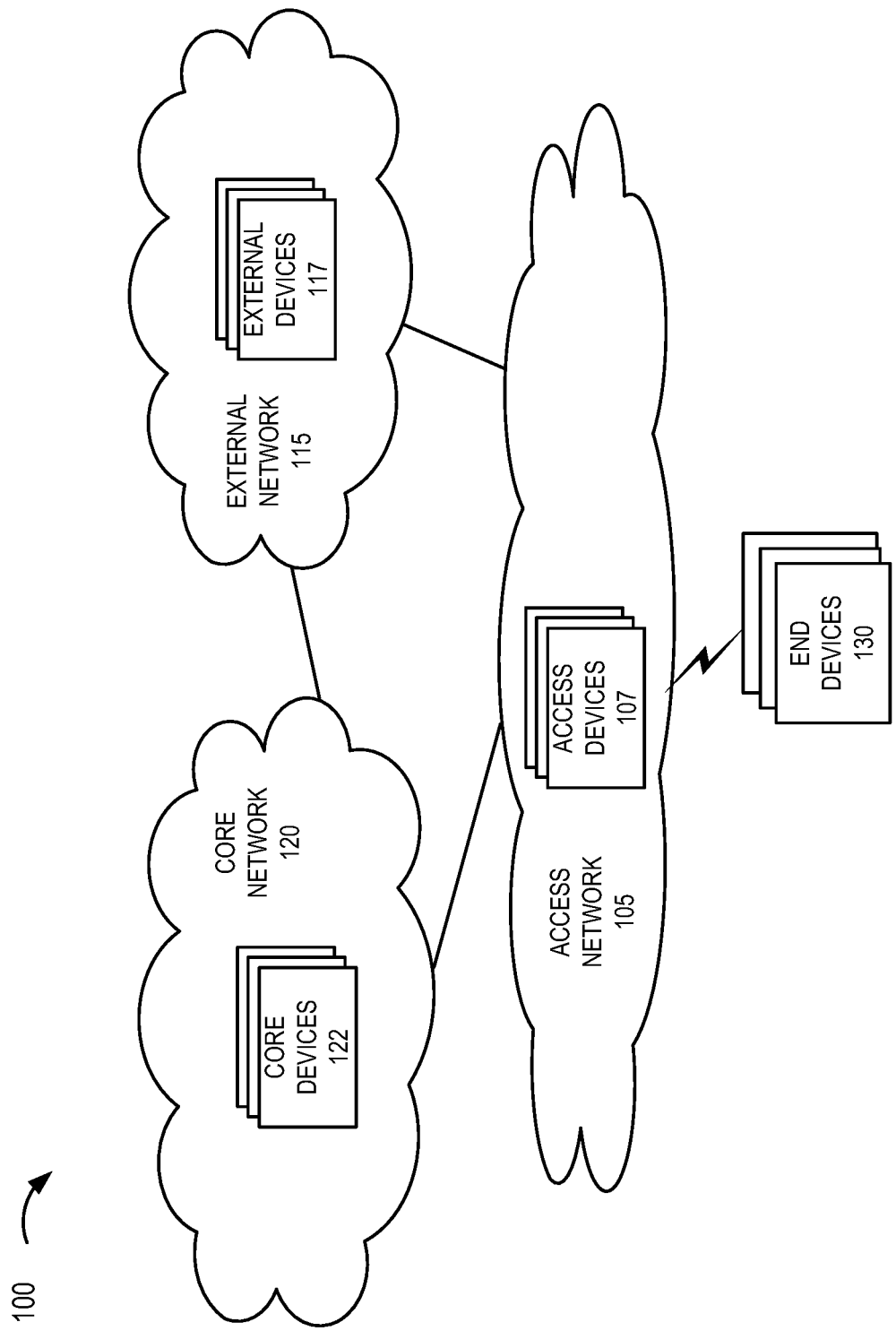
FIG. 1 is a diagram illustrating an exemplary environment in which an exemplary embodiment of an application management service may be implemented.

The following detailed description refers to the accompanying drawings. The same reference numbers in different drawings may identify the same or similar elements. Also, the following detailed description does not limit the invention.

Multi-access edge computing (MEC) (also known as mobile edge computing (MEC)) networks, cloud networks, or other types of end device application or service layer networks (referred to as "application service layer network") may not always have sufficient available resources to accommodate end devices. For example, the application service layer network may have insufficient resources (e.g., physical, logical, virtual) due to the number of end devices/users being served, the number of applications running simultaneously, the amount of content data involved in relation to the applications (e.g., 3D extreme reality, etc.), the state of the network (e.g., in the process of being deployed, reconfigured, upgraded; failures; congestion; etc.), and/or the state of neighboring networks (e.g., failures, congestion, etc.). As a result, the application service layer network may be unable to support a level of quality of service associated with an application and/or a service (referred to as an "application service").

Auto-scaling techniques may be used to manage resource allocation of the application service layer network. The scaling of resources pertaining to an application service may include vertical auto-scaling (e.g., modifying an amount of a resource allocated to a server device, etc.) and/or horizontal scaling (e.g., adding or removing a server device assigned to a virtual Internet Protocol (VIP), etc.). Auto-scaling mechanisms may dynamically adjust network resources to support the application service based on auto-scaling rules that may include various threshold values for triggering vertical and/or horizontal auto-scaling. Additionally, auto-scaling mechanisms may include resource quotas that ensure that no single application consumes all available resources or deprives available resources to other applications. On the other hand, resource quotas may limit an application to respond to genuine network spikes and may cause service quality degradation, an application malfunctioning, or even an application crash.

According to exemplary embodiments, an application management service is described. According to an exemplary embodiment, the application management service may include a platform application management service and a device application management service. According to an exemplary embodiment, the platform application management service and the device application management service may operate in a coordinated and synchronized manner that enables application services to maintain a predictable service quality even during abnormal network and/or application-based events. For example, the application management service may manage varying levels of user demand (e.g., peak-time levels of traffic, etc.), one or multiple key performance indicators (KPIs), performance metrics (e.g., latency, throughput, error rate, or another type of performance metric), denial-of-service attacks, and/or other types of malicious network activity. According to an exemplary embodiment, the platform application management service and the device application management service may each provide throttling and circuit breaker functions that operate in a coordinated and synchronized fashion, as described herein.

In view of the foregoing, the application management service may enable an application service to be resilient and stable and may prevent or minimize service quality degradation while responding to genuine network spikes and abnormal network events without unbounded network resource usage. The application management service may optimize network resource allocation and usage in view of the dynamic nature of user demand, network state, and malicious activity.

FIG. 1 is a diagram illustrating an exemplary environment 100 in which an exemplary embodiment of application management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/ or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices.

External devices 117 may also include other types of network devices that support the operation of external network 117 and the provisioning of application services, such as an orchestrator (e.g., a network function virtualization orchestrator (NFVO), a mobile edge (ME) orchestrator, etc.), an edge manager (e.g., a virtualized infrastructure manager (VIM), a virtual network function manager (VNFM), an ME platform manager), an operations support system (OSS), a local domain name system (DNS), registries, and/or other types of network devices (e.g., routers, core devices 122 (e.g., a user plane function (UPF), etc.), an ingress device, a load balancer, etc.), and/or other types of architectures and/or external devices 117 that may pertain to various network-related functions (e.g., security, management, charging, billing, authentication, authorization, policy enforcement, development, etc.). External devices 117 may include non-virtual, logical, and/or physical network devices.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

According to an exemplary embodiment, at least a portion of external devices 117 may include application management service logic and an interface that supports the application management service, as described herein.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a MME, a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. End device 130 is not to be considered a network device, as described herein.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

Figure 2:
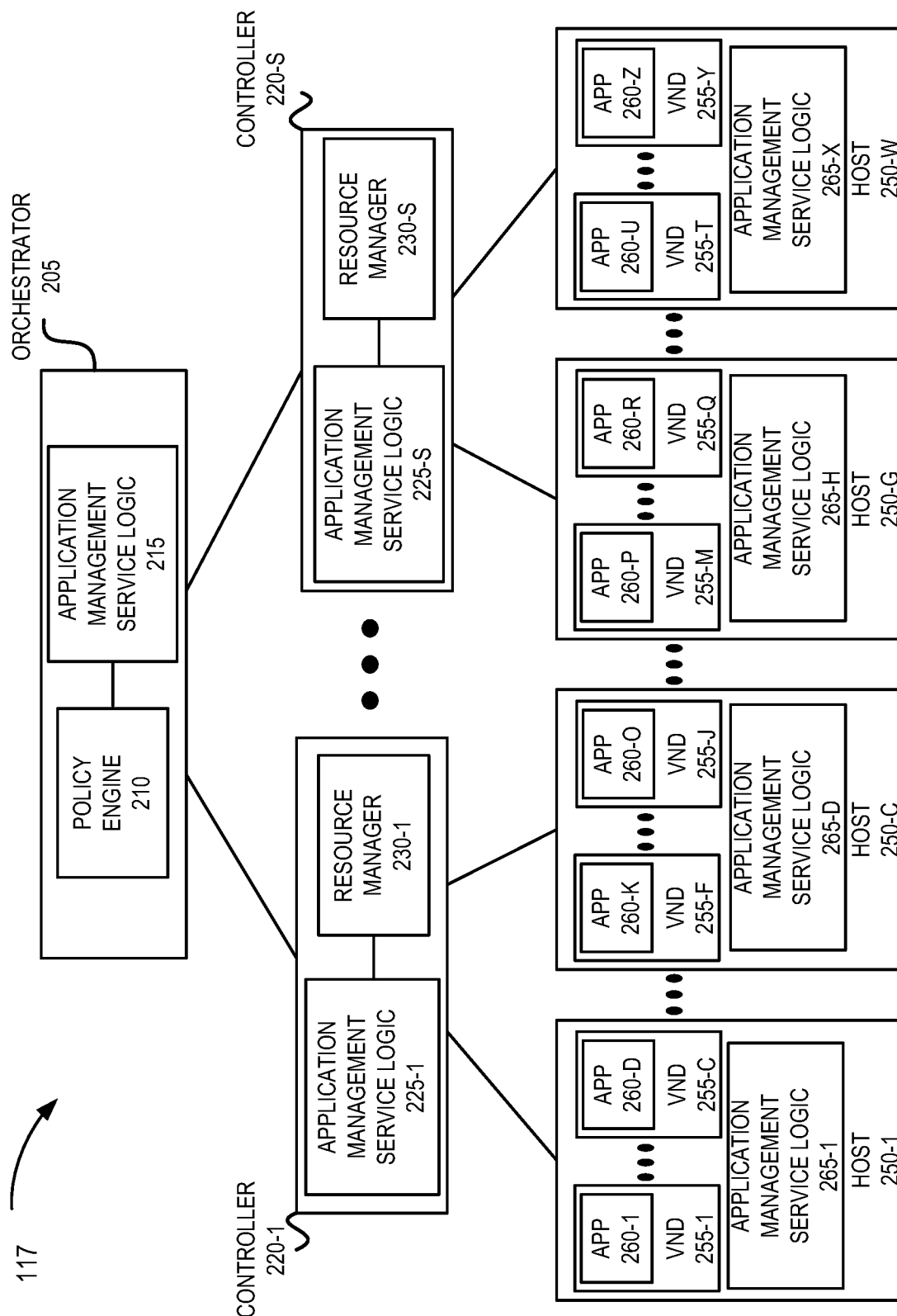
FIG. 2 is a diagram illustrating an exemplary embodiment of network devices that may provide an exemplary embodiment of the application management service.

FIG. 2 is a diagram illustrating exemplary network devices (e.g., external devices 117) of a network (e.g., external network 115) that may provide the application management service, as described herein. According to various exemplary embodiments, external devices 117 may pertain to one or multiple application layer networks, such as a MEC network, a cloud network, and so forth, as described herein. As illustrated, external devices 117 may include an orchestrator 205, controllers 220-1 through 220-S (also referred to as controllers 220, and individually or generally as controller 220), and hosts 250-1 through 250-W (also referred to as hosts 250, and individually or generally as host 250).

The number, the type, and the arrangement of external devices 117 are exemplary. The number and the arrangement of communication links illustrated are also exemplary. External network 115 may include additional and/or different external devices 117 in other exemplary embodiments. For example, external devices 117 may include additional and/or different system or management level external devices 117 that are not illustrated and described for the sake of brevity. By way of further example, external devices 117 may be implemented according to a cloud computing architecture, IaaS, PaaS, SaaS, or another type of known or future network technology. In this regard, according to other exemplary embodiments, a management, control, and/or support device, a node, middleware, a layer, a component, a function, and/or an element of the network, platform, infrastructure, or service may be implemented to provide the application management system service, as described herein.

Additionally, according to still other exemplary embodiments, external devices 117 may include a machine learning device and/or an artificial intelligence (AI) device, which may contribute (wholly or in part) to the performance of an operation of the application management service, as described herein.

Orchestrator 205 may include logic that provides the application management service. According to an exemplary embodiment, orchestrator 205 may include a policy engine 210 and application management service logic 215. Orchestrator 205 may include logic that performs other types of operations, such as management of application service/ microservice rules and requirements and/or other system level management functions pertaining to an application layer network. For example, orchestrator 205 may include logic that monitors, detects events, and reacts to changing conditions at orchestrator 205, at other external devices 117, and/or at network devices external from external network 115 (e.g., access devices 107, core devices 122, etc.).

Policy engine 210 may store auto-scaling rules for application services. For example, the auto-scaling rules may relate to a category of an application service (e.g., mission critical, real-time, non-real-time, video streaming, IoT, etc.) and/or on a per-application service basis. An auto-scaling rule may include a minimum value and/or a maximum value relating to a triggering of an auto-scale (e.g., vertical, horizontal, etc.). The auto-scale rules may include other types of information, such as a schedule for auto-scaling, a time period in which a minimum value and/or a maximum value is sustained, other types of triggering events (e.g., Hypertext Transfer Protocol (HTTP) triggers, non-HTTP triggers, etc.) and/or other types of configurable parameters (e.g., precedence between rules, resolving conflicts between rules, etc.) that may be used to govern auto-scaling.

As previously described, auto-scaling may include horizontal auto-scaling and/or vertical auto-scaling. For example, horizontal auto-scaling may include adjusting the number of instances (e.g., VMs, containers, host devices, etc.), and vertical auto-scaling may include adjusting the amount of resources (e.g., memory, disk space, processor, etc.) allocated to the instances. Auto-scaling may be based on for example, properties and/or events. For example, the parameters that could be adjusted to trigger the respective auto-scaling rule may include minimum, maximum, and/or range values relating to hardware utilization, such as processor utilization (e.g., physical, virtual, logical), memory utilization (e.g., physical, virtual, logical), and/or another type of hardware resource; number of application session requests over a time period; number of bytes received over a time period; number of bytes transmitted over a time period; a KPI threshold, a performance metric threshold, queue length and/or depth, number of pending application service requests; and/or other types of monitored parameters, properties and/or events relating to the provisioning of an application service and/or a state of the system.

Application management service logic 215 may include logic that provides an exemplary embodiment of the application management service, as described herein. For example, application management service logic 215 may obtain and analyze application management service information. For example, the application management service information may include resource utilization information, KPI information, performance metric information, and other types of metrics and/or criteria, as described herein, which may be used to provision and manage application services.

Application management service logic 215 may include logic to manage other external devices 117 based on the analysis. For example, application management service logic 215 may determine whether to invoke autoscaling (e.g., vertical autoscaling, horizontal autoscaling), determine whether the autoscaling has improved a particular state associated with a virtual network device 255, a host 250, and/or an application 260, determine whether to perform another iteration of autoscaling, determine whether to invoke another type of application management (e.g., latency-aware load balancing, throttling of (application) requests, etc.), and determine whether to invoke application management service logic 265 at host device 250. For example, as described herein, application management service logic 265 may include throttling and circuit breaker functions. Application management service logic 215 may manage other external devices 117 based on policy engine 210.

Controller 220 may include logic that manages hosts 250. According to an exemplary embodiment, controller 220 may be included in a VIM, a VNFM, an ME platform manager, or an edge controller. As illustrated, controllers 220 may include application management service logic 225-1 through 225-S (also referred to as application management service logic instances 225, and generally or individually as application management service logic 225), and resource managers 230-1 through 230-S (also referred to as resource managers 230, and individually or generally as resource manager 230).

Application management service logic 225 may include logic that provides an exemplary embodiment of the application management service, as described herein. For example, application management service logic 225 may communicate with application management service logic 215 and application management service logic 265 to enable the performance of operations associated with the application management service. Application management service logic 215 may also manage autoscaling procedures via resource manager 230 based on communication with application management service logic 215.

Application management service logic 225 may also monitor, obtain, and/or provide application management service information to application management service logic 215. For example, the information may include network information and end device information. Network information may include information relating to resource utilization for physical, virtual, and/or logical resources at controller 220, host 250, and communication links. Network information may also include information relating to network performance, such as response rates for user requests, latency, packet drop rate, throughput, jitter, and/or other types of KPIs, QoS, service level agreement (SLA) parameters, and so forth. The network information may further include other types of information relating to health, security, usage of application service (e.g., the degree at which some features of an application service are used relative to other features, etc.), fault detection, and/or resource utilization and performance information relating to other networks and network devices (e.g., access network 105, access devices 107, core network 120, core devices 122, and communication links external from external network 115 that may pertain to the provisioning and management of an application service. The collected information may further include end device information. For example, the end device information may include information relating to end device performance, such as latency, packet drop rate, etc., and/or other types of KPIs, QoS, SLA parameters, and so forth pertaining to an application service and associated application service session, host device 250, and virtual network device 255. According to other exemplary implementations, application management service logic 215 and/or application management service logic 265 may monitor, obtain, and/or provide the network information and/or the end device information, as described herein.

Resource manager 230 may include logic that manages the amount of physical, virtual, and/or logical resources provisioned for an application service. Resource manager 230 may modify the amount of resources allocated based on communication with application management service logic 215, as described herein. For example, based on an auto-scale rule, resource manager 230 may allocate resources to an application service and associated host(s) 250 based on the auto-scale rule.

Hosts 250 may include network devices that support the virtualization of application services. Host 250 provides various physical resources (e.g., processors, memory, storage, communication interface, and/or other types of hardware resources). The hardware resources may be shared, dedicated, virtualized, logical, and/or another type of configuration. The physical resources may also include software (e.g., a micro-application, a composite application, a program, or another type of application, an operating system, etc.) and other elements, such as binaries, libraries, or another type of element, layer, or function (e.g., hypervisor, container engine, etc.) that may support the operation of a virtual entity.

According to an exemplary embodiment, as illustrated, hosts 250 may include virtual network devices (VNDs) 255-1 through 255-Y (also referred to as virtual network devices 255, and individually or generally as virtual network device 255), and application management service logic 265-1 through 265-X (also referred to as application management service logic instances 260, and individually or generally as application management service logic 265).

Virtual network devices 255 may be implemented as containers, hypervisor-based (e.g., bare-metal hypervisor, hosted hypervisor) (also known as a VM), or other known (e.g., proprietary, hybrid, etc.) network function virtualization (NFV), or future generation virtualization. Virtual network devices 255 may include applications (Apps) 260-1 through 260-Z (also referred to as applications 260, and individually or generally as application 260). Application 260 may include software, firmware, and/or another form of executable code for an application service. Applications 260 may include one or multiple instances of the same or different application services. An application service may include a monolithic application, a microservice, a composite application (e.g., including multiple microservices), a distributed application, or another type of configurable architecture of the application service. Host 250 may support one or multiple virtual network devices 255 and applications 260 that provide application services.

Application management service logic 265 may include logic that provides an exemplary embodiment of the application management service, as described herein. Application management service logic 265 may be implemented as a virtualized network device, a container, a VM, or a management/control layer, for example, on host 250. For example, application management service logic 265 may include logic that provides rate limiting or throttling and circuit breaker services. For example, the throttling service may manage and limit the number of (new) end device requests (e.g., according to a maximum allowed number) that may enable the control of traffic at host 250 and/or virtual network device 255. The throttling service may also prevent the application service from crashing or malfunctioning based on denial of service attacks, for example. According to some exemplary embodiments of the application management service, application management service logic 215 (or application management service logic 225) may include logic that removes host 250 or virtual network device 255 from an ingress pool. This may be responsive to the execution of the throttling service. In this way, host 250 and/or virtual network device 255 may not be assigned any new end device requests pertaining to an application service.

The circuit breaker service may prevent an application service from retrying an operation that is likely to fail repeatedly. In this way, the application service may continue to run or operate rather than taking up time and resources while the operation may be retried exponentially. The circuit breaker service may also detect when a fault or an exception has been fixed or corrected, at which time the application service may try the operation again.

Figure 3:
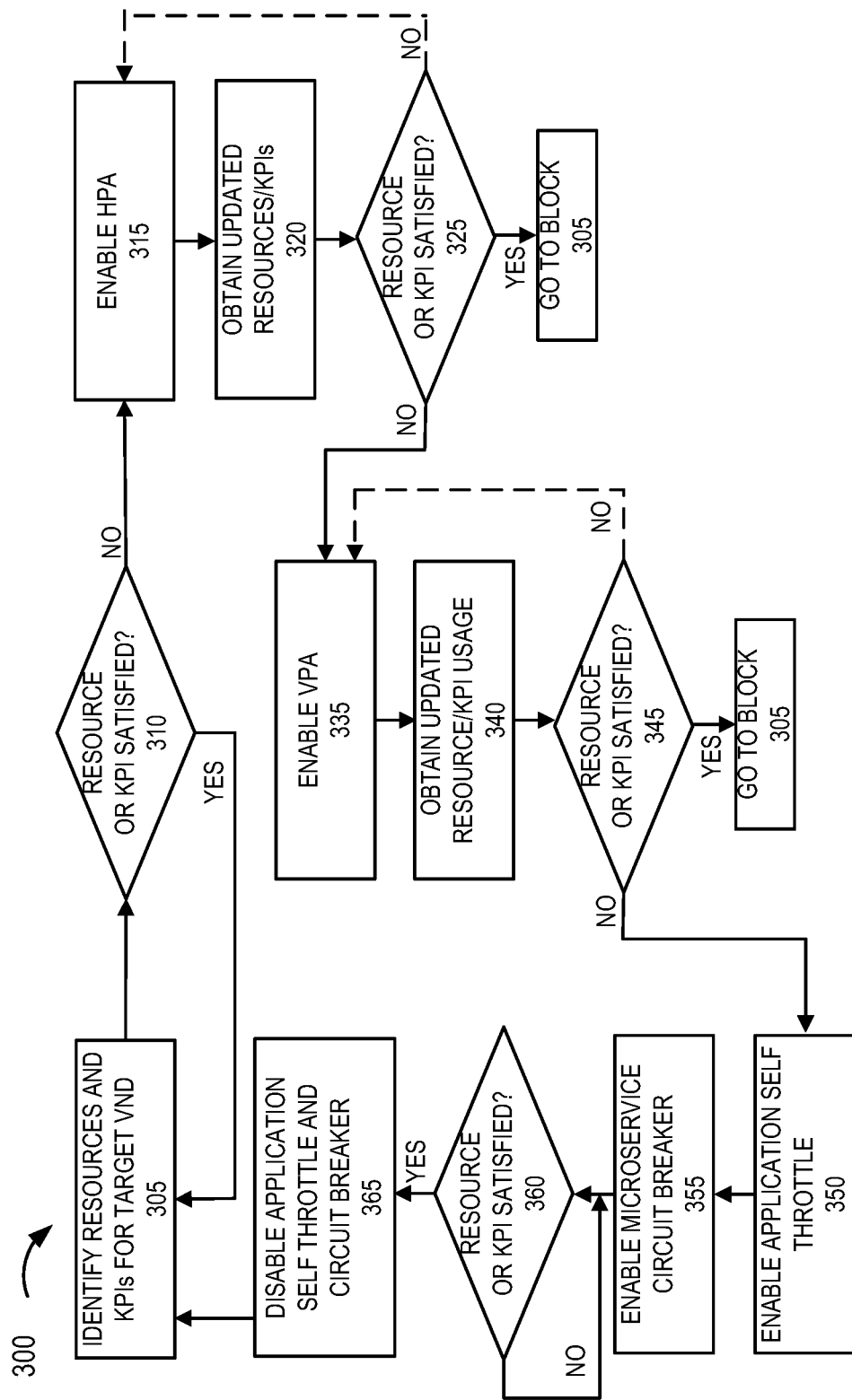
FIG. 3 is a diagram illustrating an exemplary process of an exemplary embodiment of the application management service.

FIG. 3 is a diagram illustrating an exemplary process 300 of an exemplary embodiment of the application management service. According to an exemplary embodiment, application management service logic may perform a step of process 300. For example, application management service logic 215 of orchestrator 205 and application management service logic 265 of host 250 may perform at least some of the steps of process 300. According to other examples, another control/management/support node, layer, component, etc., as described herein, may perform one or more of the steps of process 300.

As illustrated in FIG. 3, in block 305, a resource and a KPI for a virtual network device may be identified. For example, application management service logic 215 of orchestrator 205 may obtain various types of information, such as application management service information. Orchestrator 205 may identify one or multiple resources and KPIs of relevance to virtual network device 255 to analyze and determine a state or an event trigger.

In block 310, it may be determined whether a resource and/or a KPI is satisfied. For example, application management service logic 215 of orchestrator 205 may compare a resource value and/or a KPI value included in or calculated from the application management service information to corresponding threshold values. By way of further example, orchestrator 205 may determine whether a processor utilization value satisfies a threshold (e.g., a value or within a range of values) and/or whether a latency value satisfies a threshold. According to some exemplary embodiments, the threshold may be configured specific to the application service (e.g., app 260).

When it is determined that the resource and/or the KPI is satisfied (block 310—YES), process 300 may return to block 305. For example, application management service logic 215 of orchestrator 205 may obtain further application management service information over time for subsequent analysis. When it is determined that the resource and/or the KPI is not satisfied (block 310—NO), horizontal autoscaling may be enabled (block 315). For example, application management service logic 215 may invoke horizontal autoscaling based on policy engine 210. The horizontal autoscaling may also be based on other types of information, such as a degree to which the resource and/or the KPI is not satisfied, the type or the particular application service, and/or other configurable parameters included in the autoscaling rules applicable to the application service (e.g., app 260), virtual network device 255, and/or host 250. According to various exemplary scenarios, the horizontal autoscaling may involve adding or removing instances (e.g., VMs, containers, host devices, etc.), for example.

In block 320, updated resource and/or KPI information may be obtained. For example, after horizontal autoscaling is successfully performed, additional application management service information may be obtained.

In block 325, similar to block 310, it may be determined whether the resource and/or the KPI is satisfied. For example, application management service logic 215 of orchestrator 205 may compare a resource value and/or a KPI value included in or calculated from the current application management service information to corresponding threshold values.

When it is determined that the resource and/or the KPI is satisfied (block 325—YES), process 300 may return to block 305. When it is determined that the resource and/or the KPI is not satisfied (block 325—NO), vertical autoscaling may be enabled (block 335). Alternatively, process 300 may return to block 315. For example, the application management service may perform more than one iteration of horizontal autoscaling. Additionally, blocks 320 and 325 may be subsequently performed.

Referring to block 335, however, application management service logic 215 may invoke a vertical autoscaling directed to virtual network device 255 based on policy engine 210. The vertical autoscaling may also be based on other types of information, such as a degree to which the resource and/or the KPI is not satisfied, the type or the particular application service, and/or other configurable parameters included in the autoscaling rules applicable to the application 260, virtual network device 255, and/or host 250. According to various exemplary scenarios, the vertical autoscaling may involve adding or removing resources associated with the instances, for example.

In block 340, updated resource and/or KPI information may be obtained. For example, after vertical autoscaling is successfully performed, additional application management service information may be obtained.

In block 345, it may be determined whether the resource and/or the KPI is satisfied. For example, application management service logic 215 of orchestrator 205 may compare a resource value and/or a KPI value included in or calculated from the current application management service information to corresponding threshold values.

When it is determined that the resource and/or the KPI is satisfied (block 345—YES), process 300 may return to block 305. When it is determined that the resource and/or the KPI is not satisfied (block 345—NO), application self-throttling may be enabled (block 350). Alternatively, process 300 may return to block 335. For example, the application management service may perform more than one iteration of vertical autoscaling. Additionally, blocks 340 and 345 may be subsequently performed.

Referring to block 350, however, application management service logic 215 may communicate to or instruct application management service logic 265 associated with the target virtual network device 255, host device 250, and/or application 260 to perform the throttling service, as described. Additionally, or alternatively, application management service logic 215 may communicate to or instruct application management service logic 265 to perform the circuit breaker service, as described herein. As illustrated, in blocks 350 and 355, application management service logic 265 may perform the throttling and/or circuit breaker services, respectively, in response to the communication or instruction, for example.

In block 360, it may be determined whether the resource and/or the KPI is satisfied. For example, application management service logic 215 of orchestrator 205 or application management service logic 265 may compare a resource value and/or a KPI value included in or calculated from the current application management service information to corresponding threshold values.

When it is determined that the resource and/or the KPI is satisfied (block 360—YES), the throttling and/or the circuit breaker services may be disabled (block 365). Thereafter, process 300 may return to block 305. When it is determined that the resource and/or the KPI is not satisfied (block 365—NO), process 300 may include performing one or more iterations of the throttling and/or the circuit breaker services. Alternatively, process 300 may include the performance of other remedial measures, such as application session handover to another virtual network device 255, host 250, or another external network 115 to service existing application service sessions. Additionally, or alternatively, process 300 may include just waiting for a steady or normal state (e.g., for block 360 to be satisfied).

Figure 4:
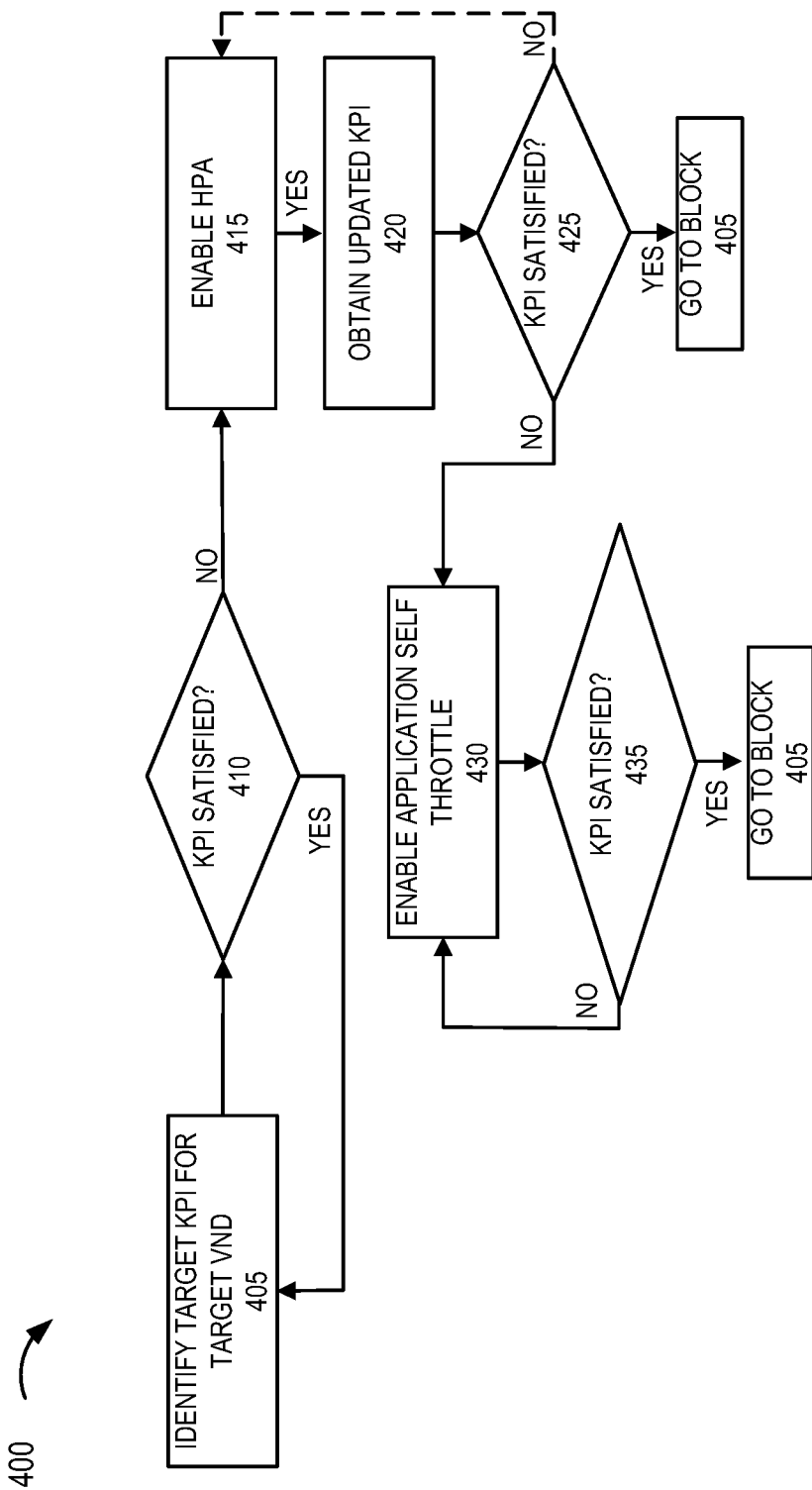
FIG. 4 is a diagram illustrating another exemplary process of an exemplary embodiment of the application management service.

FIG. 4 is a diagram illustrating an exemplary process 400 of an exemplary embodiment of the application management service. For example, process 400 may pertain to managing a specific KPI, such as queue depth or the number of outstanding requests (e.g., HTTPS requests or another type of request). According to an exemplary embodiment, application management service logic may perform a step of process 400. For example, application management service logic 215 of orchestrator 205 and application management service logic 265 of host 250 may perform at least some of the steps of process 400. According to other examples, another control/management/support node, layer, component, etc., as described herein, may perform one or more of the steps of process 400.

As illustrated in FIG. 4, in block 405, a KPI for a virtual network device may be identified. For example, application management service logic 215 of orchestrator 205 may obtain various types of information, such as application management service information. Orchestrator 205 may identify the KPI of relevance to virtual network device 255 to analyze and determine a state or an event trigger. For example, the state or event trigger may relate to customer demand (e.g., increase or decrease) or a denial-of-service attack (e.g., increase of requests, etc.). According to other examples, a different KPI may be identified, such as packet drop, latency, peak data rate, reliability, application service availability, or another type of configured KPI. According to even other examples, the KPI may relate to transactions per second (TPS) and/or connections per second (CPS) in which a threshold may help determine how busy the application is or a latency threshold in responses or requests may help show that a choke point has developed. According to other examples, process 400 may include identifying a resource instead of or in addition to a KPI. For example, a threshold (e.g., utilization, available, etc.) for a compute resource such as CPU, memory, or storage may help identify and avoid current or prospective application instability. According to yet another example, a packet drop threshold may be used to determine whether the application or its environment is unhealthy. Additionally, a delta pertaining to a historical trend (e.g., KPI or resource-related) may also be used as a basis for monitoring and subsequent action if determined.

In block 410, it may be determined whether the KPI is satisfied. For example, application management service logic 215 of orchestrator 205 may compare a KPI value included in or calculated from the application management service information to a corresponding threshold value.

When it is determined that the KPI is satisfied (block 410—YES), process 400 may return to block 405. For example, application management service logic 215 of orchestrator 205 may obtain further application management service information over time for subsequent analysis. When it is determined that the KPI is not satisfied (block 410—NO), horizontal autoscaling may be enabled (block 415). For example, application management service logic 215 may invoke horizontal autoscaling based on policy engine 210. The horizontal autoscaling may also be based on other types of information, such as a degree to which the KPI is not satisfied, the type or the particular application service, and/or other configurable parameters included in the autoscaling rules applicable to the application service (e.g., app 260), virtual network device 255, and/or host 250. According to various exemplary scenarios, the horizontal autoscaling may involve adding or removing instances (e.g., VMs, containers, host devices, etc.).

In block 420, updated KPI information may be obtained. For example, after horizontal autoscaling is successfully performed, additional application management service information may be obtained.

In block 425, it may be determined whether the KPI is satisfied. For example, application management service logic 215 of orchestrator 205 may compare a KPI value included in or calculated from the current application management service information to the corresponding threshold value.

When it is determined that the KPI is satisfied (block 425—YES), process 400 may return to block 405. When it is determined that the KPI is not satisfied (block 425—NO), a throttling service may be enabled (block 430). Alternatively, one or more additional iterations of horizontal autoscaling may be performed before enabling the throttling service, as illustrated in FIG. 4.

Referring to block 430, however, application management service logic 215 may communicate to or instruct application management service logic 265 associated with the target virtual network device 255, host device 250, and/or application 260 to perform the throttling service, as described.

In block 435, it may be determined whether the KPI is satisfied. For example, application management service logic 215 of orchestrator 205 or application management service logic 265 may compare a KPI value included in or calculated from the current application management service information to the corresponding threshold value. When it is determined that the KPI is satisfied (block 435—YES), process 400 may return to block 405. When it is determined that the KPI is not satisfied (block 435—NO), additional throttling may be performed and/or other remedial measures may be executed (e.g., application session handovers, etc.).

Figure 5:
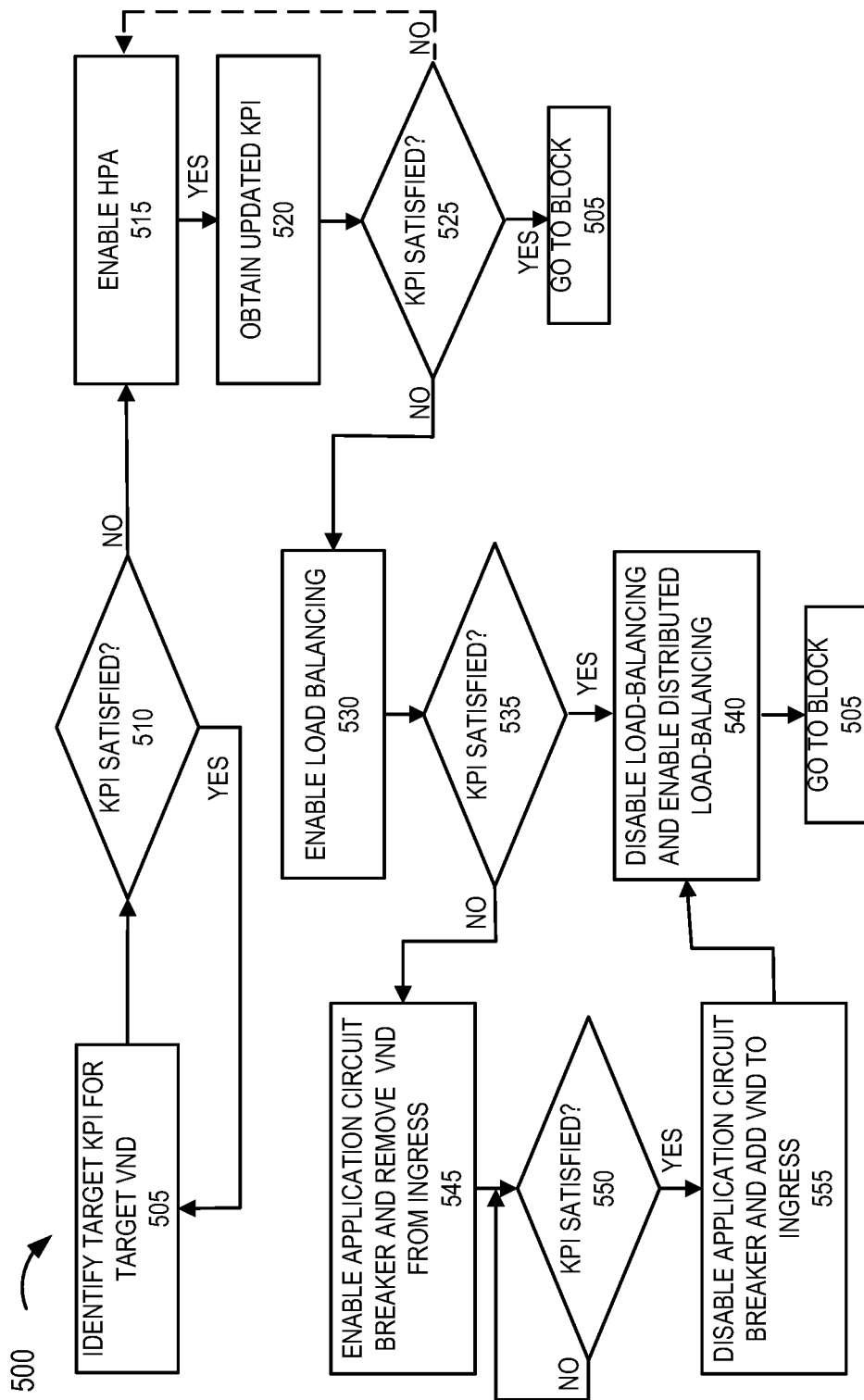
FIG. 5 is a diagram illustrating still another exemplary process of an exemplary embodiment of the application management service.

FIG. 5 is a diagram illustrating an exemplary process 500 of an exemplary embodiment of the application management service. According to an exemplary embodiment, application management service logic may perform a step of process 500. For example, application management service logic 215 of orchestrator 205 and application management service logic 265 of host 250 may perform at least some of the steps of process 500. According to other examples, another control/management/support node, layer, component, etc., as described herein, may perform one or more of the steps of process 500.

As illustrated in FIG. 5, in block 505, a KPI for a virtual network device may be identified. For example, application management service logic 215 of orchestrator 205 may obtain various types of information, such as application management service information. Orchestrator 205 may identify the KPI of relevance to virtual network device 255 to analyze and determine a state or an event trigger. For example, the state or event trigger may relate to customer demand (e.g., increase or decrease) or a denial-of-service attack (e.g., increase of requests). According to other examples, the KPI may relate to a different KPI (e.g., packet drop, latency, peak data rate, reliability, application service availability, or another type of configured KPI). According to other examples, process 500 may relate to a resource instead of a KPI.

In block 510, it may be determined whether the KPI is satisfied. For example, application management service logic 215 of orchestrator 205 may compare a KPI value included in or calculated from the application management service information to a corresponding threshold value.

When it is determined that the KPI is satisfied (block 510—YES), process 500 may return to block 505. For example, application management service logic 215 of orchestrator 205 may obtain further application management service information over time for subsequent analysis. When it is determined that the KPI is not satisfied (block 510—NO), horizontal autoscaling may be enabled (block 515). For example, application management service logic 215 may invoke horizontal autoscaling based on policy engine 210. The horizontal autoscaling may also be based on other types of information, such as a degree to which the KPI is not satisfied, the type or the particular application service, and/or other configurable parameters included in the autoscaling rules applicable to the application service (e.g., app 260), virtual network device 255, and/or host 250. According to various exemplary scenarios, the horizontal autoscaling may involve adding or removing instances (e.g., VMs, containers, host devices, etc.).

In block 520, updated KPI information may be obtained. For example, after horizontal autoscaling is successfully performed, additional application management service information may be obtained.

In block 525, it may be determined whether the KPI is satisfied. For example, application management service logic 215 of orchestrator 205 may compare a KPI value included in or calculated from the current application management service information to the corresponding threshold value.

When it is determined that the KPI is satisfied (block 525—YES), process 500 may return to block 505. When it is determined that the KPI is not satisfied (block 525—NO), a load balancing service may be enabled (block 530). Alternatively, one or more additional iterations of horizontal autoscaling (block 515) may be performed before enabling the load balancing service, as illustrated in FIG. 5.

Referring to block 530, for example, application management service logic 215 of orchestrator 205 may perform a load balancing service relative to the target virtual network device 255 or app 260. For example, orchestrator 205 may prevent or reduce new PDU session requests for app 260 to be directed to the target virtual network device 355 or app 260. Orchestrator 205 may subsequently obtain updated KPI information.

In block 535, it may be determined whether the KPI is satisfied. For example, application management service logic 215 of orchestrator 205 may compare a KPI value included in or calculated from the current application management service information to the corresponding threshold value.

When it is determined that the KPI is satisfied (block 535—YES), application management service logic 215 of orchestrator 205 may disable the selective load balancing service and may enable a distributed load balancing service in which orchestrator 205 may permit new PDU session requests to be directed to the target virtual network device 255 or app 260 (block 540). Thereafter, process 500 may return to block 505.

When it is determined that the KPI is not satisfied (block 535—NO), application service logic 215 and/or application management service logic 265 may enable the circuit breaker service and may remove the target virtual network device 255, host 250, and/or app 260 as an available resource (block 545). For example, orchestrator 202 may communicate with application management service logic 265 to enable the circuit breaker service. In response, application management service logic 265 may perform the circuit breaker service, as described herein. Additionally, for example, orchestrator 202 may remove the target virtual network device 255, application 260, and/or host 250 as an ingress network resource. Orchestrator 205 may subsequently obtain updated KPI information.

In block 550, it may be determined whether the KPI is satisfied. For example, application management service logic 215 of orchestrator 205 may compare a KPI value included in or calculated from the current application management service information to the corresponding threshold value.

When it is determined that the KPI is satisfied (block 550—YES), application management service logic 215 of orchestrator 205 may disable the circuit breaker service and may add the target virtual network device 255, application 260, and/or host 250 as an ingress network resource (block 555). Process 500 may return to block 540 in which application management service logic 215 of orchestrator 205 may disable the selective load balancing service and may enable a distributed load balancing service in which orchestrator 205 may permit new PDU session requests to be directed to the target virtual network device 255 or app 260 (block 540). Thereafter, process 500 may return to block 505.

When it is determined that the KPI is not satisfied (block 550—NO), orchestrator 205 may perform other remedial measures, as described herein, or wait until the target virtual network device 255, application 260, and/or host 250 achieves a steady or normal state.

Figure 6:
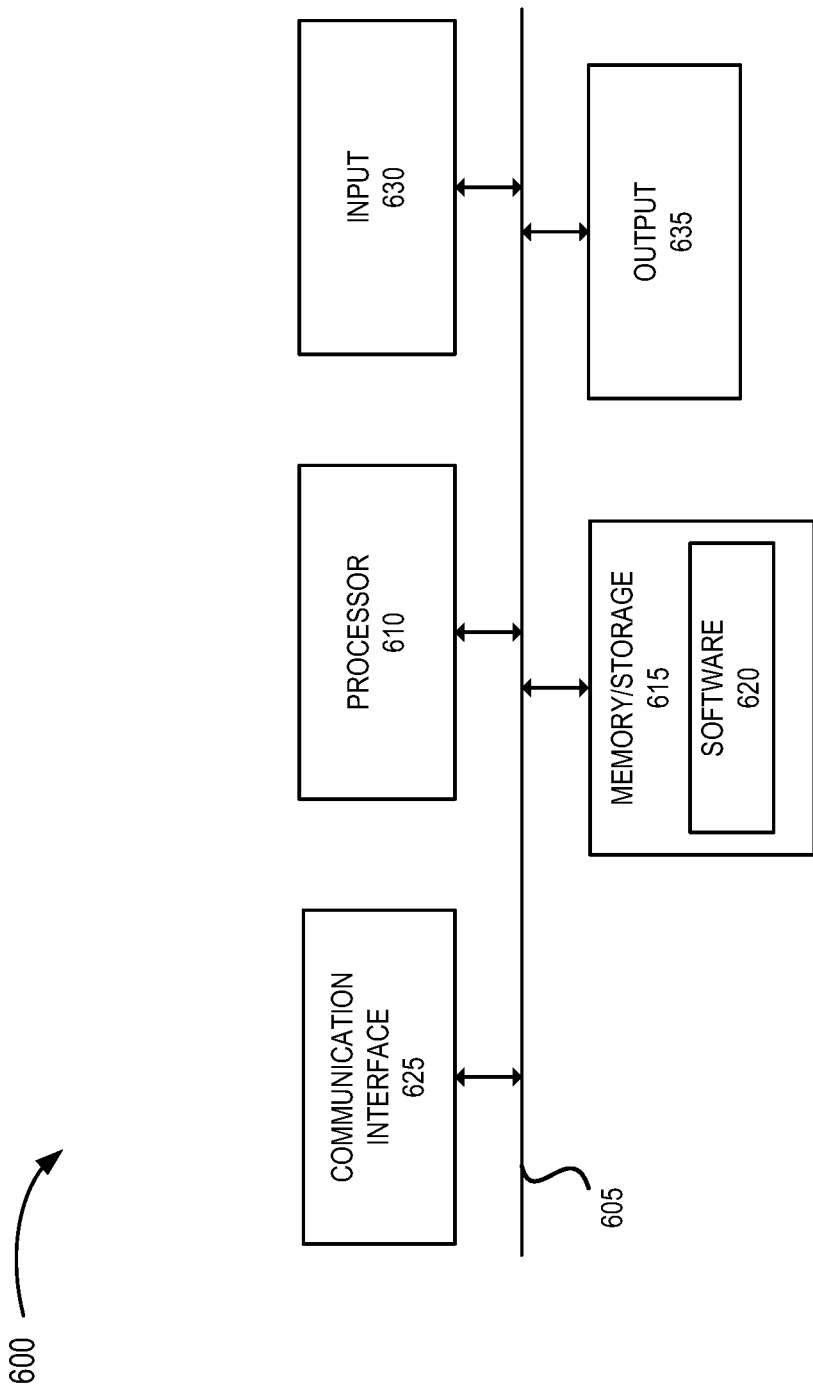
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to access device 107, external device 117, core device 122, end device 130, orchestrator 205, controller 220, host 250, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to orchestrator 205, software 620 may include an application that, when executed by processor 610, provides a function and/or a process of application management service, as described herein. Additionally, with reference to host device 250, software 620 may include an application that, when executed by processor 610, provides a function and/or a process of application management service, as described herein. Also, with reference to controller 220 or other devices, software 620 may include an application that, when executed by processor 610, provides a function and/or a process of application management service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a function or a process described herein. Alternatively, for example, according to other implementations, device 600 performs a function or a process described herein based on the execution of hardware (processor 610, etc.).

Figure 7:
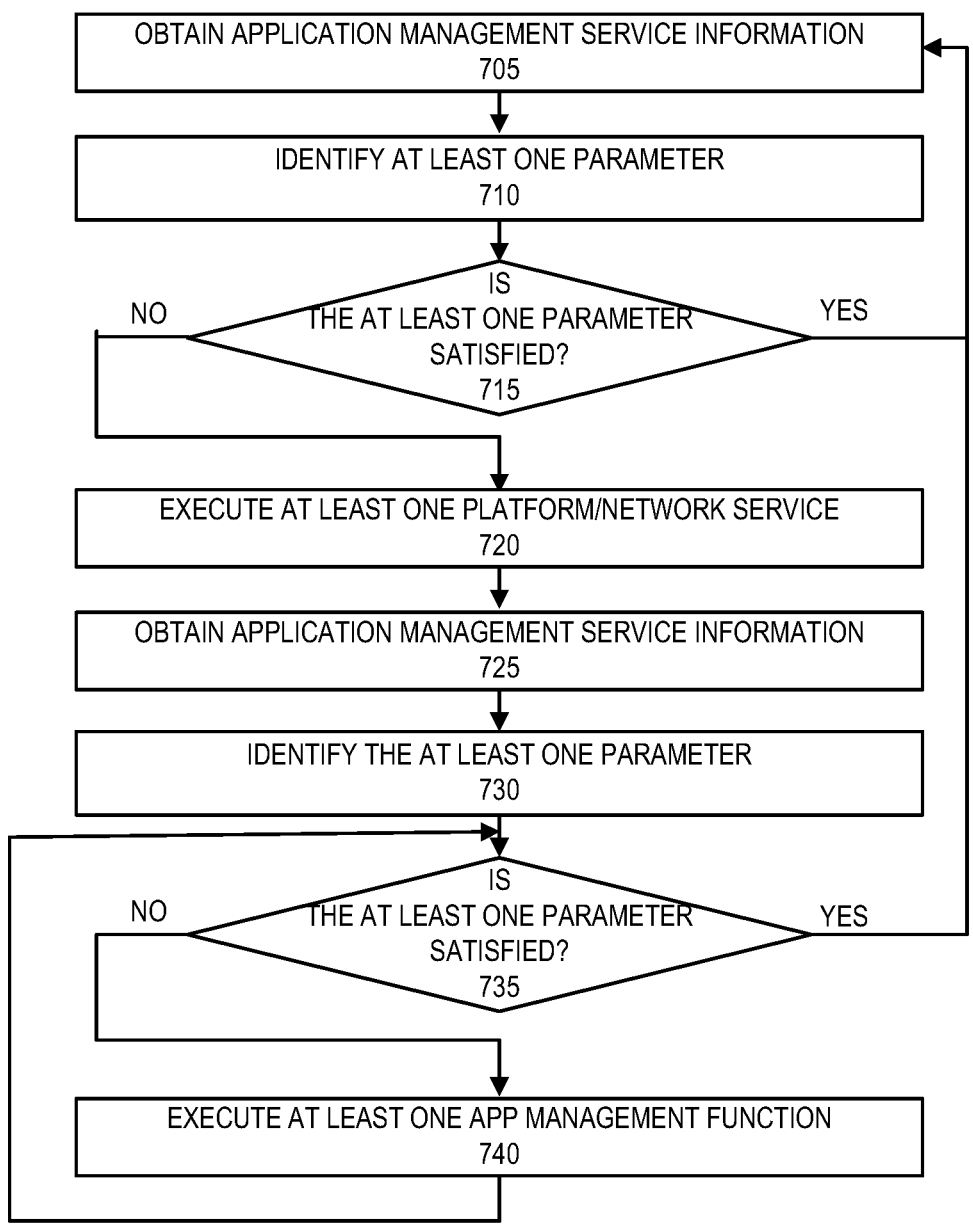
FIG. 7 is a flow diagram illustrating yet another exemplary process of an exemplary embodiment of an application management service.

FIG. 7 is a flow diagram illustrating an exemplary process 700 of an exemplary embodiment of application management service. According to an exemplary embodiment, external device 117 may perform a step of process 700. According to an exemplary implementation, processor 610 executes software 620 to perform the step of process 700, as described herein. Alternatively, the step may be performed by execution of only hardware. Process 700 may be directed to an application service, a virtual network device (e.g., VND 255), a host device (e.g., 250), a cluster of host devices, another logical or virtual division or portion of external network 115, or at a network level scale.

In block 705, external device 117 may obtain application management service information, as described herein. In block 710, external device 117 may identify at least one parameter of relevance. For example, the at least one parameter may relate to one or multiple parameters associated with a resource, a KPI, a performance metric, an SLA, and/or another configurable parameter of relevance to management of an application service.

In block 715, external device 117 may determine whether the at least one parameter is satisfied. For example, external device 117 may compare a value associated with the at least one parameter to at least one threshold. When it is determined that the at least one parameter is satisfied (block 715—YES), process 700 may return to block 705. When it is determined that the at least one parameter is not satisfied (block 715—NO), external device 117 may execute at least one platform/network service (block 720). For example, external device 117 may determine, select, and execute at least one of a type of autoscaling, a load balancing service, or a removal service (e.g., remove a virtual network device, a host device, etc., as an available resource for selection and use regarding new requests, etc.), as described herein.

In block 725, external device 117 may obtain application management service information, as described herein. In block 730, external device 117 may identify the at least one parameter of relevance.

In block 735, external device 117 may determine whether the at least one parameter is satisfied. For example, external device 117 may compare a value associated with the at least one parameter to at least one threshold. When it is determined that the at least one parameter is satisfied (block 735—YES), process 700 may return to block 705. When it is determined that the at least one parameter is not satisfied (block 735—NO), external device 117 may invoke and execute at least one application management function (block 740). For example, external device may select at least one of a throttling service or a circuit breaker service. The application management function may be performed a host device or a virtual network device, for example, as described herein.

FIG. 7 illustrates an exemplary embodiment of a process of application management service, according to other exemplary embodiments, the application management service may perform additional operations, fewer operations, and/or different operations than those illustrated and described. For example, after block 740, process 700 may include further determinations regarding whether the at least one parameter is satisfied or not. Additionally, process 700 may include, when the at least one parameter is satisfied to disable a platform/network service and/or an application management function, as described herein. According to other exemplary embodiments of the application management service, as described herein, the order of executing and/or invoking platform/network level application management functions and application level application management functions may be different. For example, a circuit breaker function and/or a throttling function may be invoked or executed before an autoscaling function. Additionally, or alternatively, platform/network level and application level functions may be invoked or executed in a parallel or serial manner.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 3-5, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   determining, by a network device, that at least one parameter pertaining to an application service is not satisfied;
   executing, by the network device, at least one of multiple network or platform level management functions directed to the application service;
   determining, by the network device after the executing, that the at least one parameter is not satisfied; and
   invoking, by the network device, at least one of multiple application level management functions directed to the application service.

2. The method of claim 1, wherein the at least one of multiple network or platform level management functions includes horizontal autoscaling, vertical autoscaling, load balancing, or removing a virtual network device.

3. The method of claim 1, wherein the at least one of multiple application level management functions includes a throttling function or a circuit breaker function.

4. The method of claim 1, wherein the at least one parameter pertains to at least one of a network resource, a key performance indicator (KPI), a performance metric, or a service level agreement parameter associated with the application service.

5. The method of claim 1, further comprising:
   comparing, by the network device after the executing, a value of the at least one parameter to at least one corresponding threshold value.

6. The method of claim 1, further comprising:
   determining, by the network device after the invoking, whether the at least one parameter is satisfied.

7. The method of claim 1, further comprising:
   obtaining, by the network device, application management service information that includes at least one value of the at least one parameter.

8. The method of claim 1, wherein the network device comprises an orchestrator.

9. A network device comprising:
   a processor configured to:
      determine that at least one parameter pertaining to an application service is not satisfied;
      execute at least one of multiple network or platform level management functions directed to the application service;
      determine, based on the execution, that the at least one parameter is not satisfied; and
      invoke at least one of multiple application level management functions directed to the application service.

10. The network device of claim 9, wherein the at least one of multiple network or platform level management functions includes horizontal autoscaling, vertical autoscaling, load balancing, or removing a virtual network device.

11. The network device of claim 9, wherein the at least one of multiple application level management functions includes a throttling function or a circuit breaker function.

12. The network device of claim 9, wherein the at least one parameter pertains to at least one of a network resource, a key performance indicator (KPI), a performance metric, or a service level agreement parameter associated with the application service.

13. The network device of claim 9, wherein the processor is further configured to:

compare, after the execution, a value of the at least one parameter to at least one corresponding threshold value.

14. The network device of claim 9, wherein the processor is further configured to:
determine, after the invocation, whether the at least one parameter is satisfied.

15. The network device of claim 9, wherein the processor is further configured to:
obtain application management service information that includes at least one value of the at least one parameter.

16. The network device of claim 9, wherein the network device comprises an orchestrator.

17. A non-transitory computer-readable storage medium storing instructions executable by a processor of a network device, wherein the instructions are configured to:
determine that at least one parameter pertaining to an application service is not satisfied;
execute at least one of multiple network or platform level management functions directed to the application service;
determine, based on the execution, that the at least one parameter is not satisfied; and
invoke at least one of multiple application level management functions directed to the application service.

18. The non-transitory computer-readable storage medium of claim 17, wherein the at least one parameter pertains to at least one of a network resource, a key performance indicator (KPI), a performance metric, or a service level agreement parameter associated with the application service.

19. The non-transitory computer-readable storage medium of claim 17, wherein the at least one of multiple application level management functions includes a throttling function or a circuit breaker function.

20. The non-transitory computer-readable storage medium of claim 17, wherein the instructions further comprise instructions configured to:
obtain application management service information that includes at least one value of the at least one parameter.

* * * * *